Patented May 29, 1951

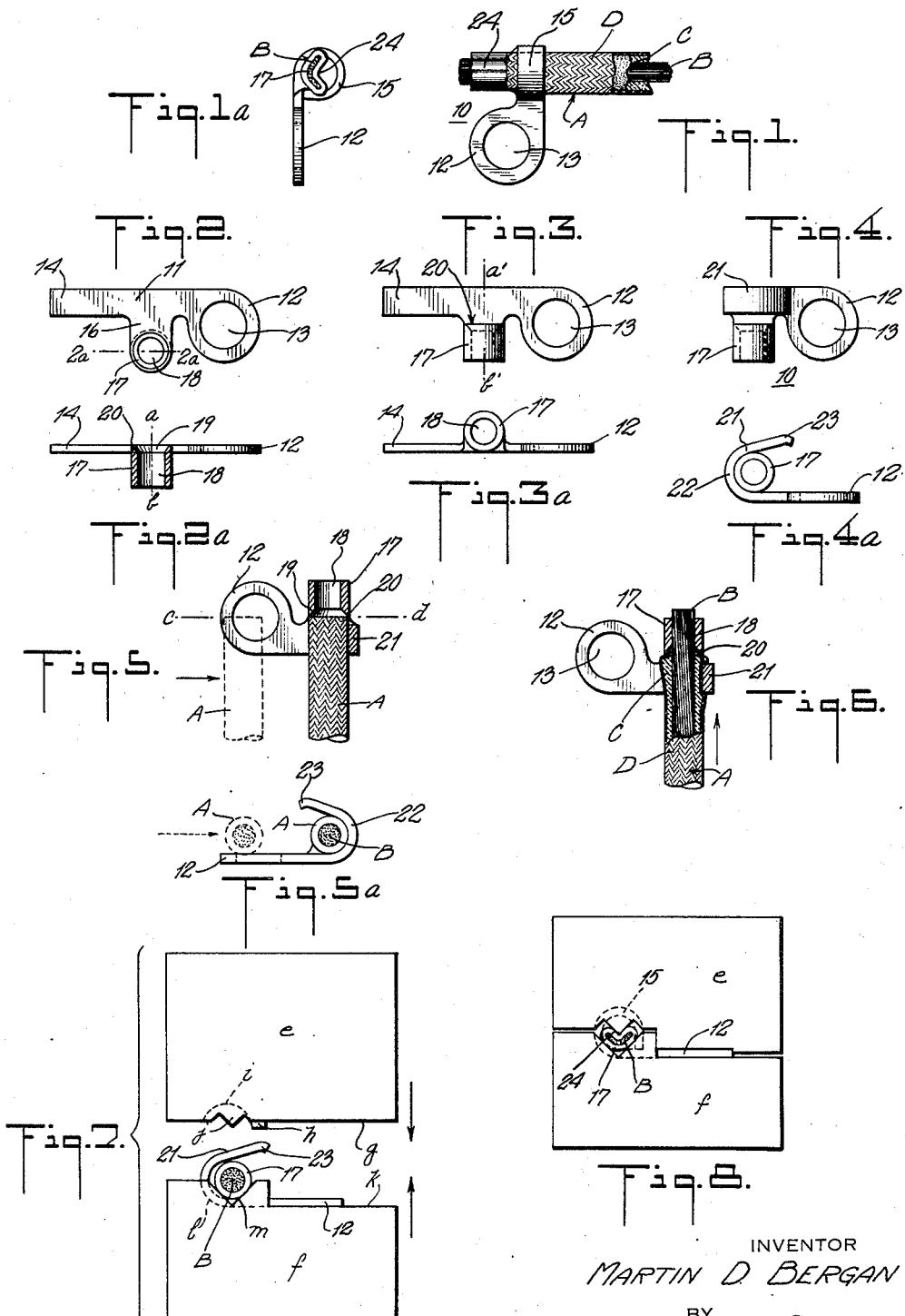

2,555,075

UNITED STATES PATENT OFFICE 2,555,075

FLAG TYPE ELECTRIC TERMINAL

Martin D. Bergan, Westfield, N. J., assignor to The Thomas & Betts Co., Elizabeth, N. J., a corporation of New Jersey Application June 3, 1946, Serial No. 673,948

5 Claims. (Cl. 173—269)

The invention relates to a terminal for an electric cable, cord or conductor and to a method for fabricating the same and to a method for attaching the terminal to the cable. The invention specifically relates to a terminal designed for use with an insulated cable of a type which does not readily permit the usual practice of stripping back its insulation to expose its conductor for attachment to the terminal. For instance, a known form of insulated conductor or cable has its insulation made up of asbestos jacketed in a non-inflammable braid. This type of insulation is very difficult to cut and skin from its conductor as is usual in attaching cables to their terminals. However, this type of insulation is so loosely wound on its conductor that it can be telescoped back sufficiently to expose an end of the conductor. Advantage is taken of this stripping possibility in the instant situation.

The primary object of the invention is to provide a simple form of terminal which can be positively secured both mechanically and electrically to an insulated cable by a simple crimping operation and without necessity of stripping off its insulation or otherwise preparing the cable to receive the terminal.

Broadly, this objective is attained by providing a form of terminal which includes a tube with a bore sufficiently large to receive the conductor but not sufficient to receive its insulation, so that when the cable is pressed endwise against the tube end, the conductor is free to slide into the bore but the tube stops the advance of the insulation and acts as the cable is pushed forward to strip the insulation off the conductor end incidentally crowding the insulation back upon itself without otherwise affecting it.

It is a commercial requirement of terminals of the type herein discussed that they be made cheaply; that they be of small all-over dimensions to fit in the limited spaces available to them and accordingly the present disclosure features compactness particularly in the disposition of the cable engaging parts and the utilization of the least possible amount of material required to have them function efficiently.

The present disclosure in its method aspect features a simple and easily practiced technique in the forming of the terminal as an article of manufacture capable of being formed cheaply in large numbers as a factory proposition and which later can be installed on the cables in the field by means of a simple hand crimping tool.

Various other objects and advantages of the invention will be in part obvious from an inspection of the accompanying drawings and in part will be more fully set forth in the following description of one form of device embodying the invention, and of the methods herein disclosed, and the invention also consists in certain new and novel features of construction and combination of parts hereinafter set forth and claimed.

In the accompanying drawings all of the figures are very much enlarged to illustrate the details of construction.

In the drawings:

Fig. 1 is a view in side elevation of a terminal forming a preferred embodiment of the invention, engaging an end of a cable to form a complete cable and terminal assembly;

Fig. 1a is a view in end elevation of the showing in Fig. 1;

Figs. 2 and 2a are respectively a plan and an end elevation of the terminal of Fig. 1 at the end of the tube drawing step and disclosing the tube in axial cross section on the line 2a—2a of Fig. 2;

Figs. 3 and 3a are respectively a plan and end elevation of the terminal with the drawn tube bent to extend parallel to the balance of the blank;

Figs. 4 and 4a are respectively a plan and an end elevation of the terminal at the completion of its preliminary bendings and when in its marketable form, before being secured to the cable;

Figs. 5 and 5a are respectively a plan and an end elevation showing the first step in assembling the terminal of Fig. 4 to the cable with the cable engaging part of the terminal in axial section;

Fig. 6 is a view largely in axial section of the cable and terminal showing the next step in the assembling of the same;

Figs. 7 and 8 are each diagrammatical views of the dies of a crimping tool or machine for forming the finished assembly of cable and terminal shown in Fig. 1;

Fig. 7 showing the dies in open position with preliminary assembly of Fig. 6 located therein; and Fig. 8 showing the dies in closed position to form the complete assembly of Fig. 1.

In the drawings and referring first to the finished assembly shown in Fig. 1, there is disclosed an insulated conductor or cable permanently secured mechanically and electrically to a metallic terminal particularly forming the subject matter of this disclosure. More specifically there is disclosed a cable A of the type formed of stranded copper wires B with an insulation C made primarily of asbestos and encased in a non-inflammable braided covering D.

The terminal 10 is of the flag type and is made from a blank 11 punched from a flat strip of metal preferably copper or one of its alloys. The stamping forming the blank comprises at one end a relatively wide tang, lug or tongue 12 provided conventionally with an aperture 13. The other end is a long narrow rectangular strip 14 forming in the finished device an insulation grip forming end 15, in the form of a split sleeve. About midlength of the blank and adjacent the tang is a laterally extending projection 16 on the same side of the blank as the tang. This projection is subjected to a successive punching method usually used for drawing cylindrical parts from sheet metal. As the result of this operation there is formed a tube or barrel 17 of relatively small internal diameter dimensioned to receive the conductor B with a fairly snug sliding fit. At this time the tube 17 is disposed with its axis $a$—$b$ extending at right angles to the plane of the balance of the blank as shown in Figs. 2 and 2a. In the formation of the bore 18 of the tube, the portion at the root end thereof becomes funnel-shaped to form a wire receiving throat 19 as particularly shown in Fig. 2a.

The tube is then bent at its root end 90° from its initial position to bring its axis $a$—$b$ into a plane parallel to and offset slightly from the plane of the balance of the blank as shown in Figs. 3 and 3a. In this position the inner end of the tube, that is the end containing the throat 19, provides an upstanding annular stop shoulder 20.

The long strip 14 is then bent back upon itself and about the axis $a'$—$b'$ of the tube for about 130° to provide a grip forming tongue 21 whose crotch portion 22 has a radius substantially equal to that of the cable A and which crotch portion is substantially concentric with the tube as shown in Figs. 4 and 4a. The device as thus far constructed constitutes the terminal as packed and marketed and ready to be applied to the cable as hereinafter suggested.

In order to secure the terminal to a cable end the cable is cut off squarely so that the ends of the insulation C and conductor B are in the same transverse plane $c$—$d$ (see Fig. 5). The cut-off end of the cable is then laid on the terminal with the end of the cable in line with the stop shoulder 20 and opposite the opening of the U-shaped tongue 21 as suggested in ghost outlines in Figs. 5 and 5a. The cable end is then moved laterally as indicated by the dot and dash arrow into snug engagement with the crotch portion 22 as indicated in full lines in Figs. 5 and 5a. The conductor B is then opposite the throat opening of the bore 18.

The cable is then shifted axially in the direction of its adjacent end, that is upwardly as indicated by the long arrow in Fig. 6. As the cable is advanced towards the tube the conductor is caused to slide through the bore 18 for a distance usually controlled by stop gauges on the compression machine hereinafter referred to and usually extends to a position projecting slightly beyond the opposite end of the tube. The funnel-like throat 19 assists in gathering the wire strands forming the conductor into a compact bundle as they are advanced into the bore. The insulation abuts the stop shoulder 20, is stopped thereby and of course does not advance with the advance of the conductor. This means that the advance end of the conductor slides out of the end portion of the insulation thus exposing the end portion of the conductor for direct electric contact with the tube when crimped thereon. The portion of the insulation thus stripped off the conductor is crowded back upon the next adjacent portion of the insulation resulting in a slight increase in diameter of the portion of the insulation within the outline of the tongue 21 as indicated at the upper end of Fig. 6.

The resulting expansion of the insulation is not resisted by the tongue 21 which has been designed in its internal crotch area to accommodate such increase in diameter of the insulation.

The assembly of terminal and cable as thus formed is inserted into an air operated or similar power operated bench assembly staking tool provided with die inserts such as are shown in Figs. 7 and 8. These die inserts include an upper die $e$ and a lower die $f$. The upper die includes in its work engaging underface $g$ a depending projection $h$ for engaging and bending down the extreme free end 23 of the tongue 21. The surface $g$ is also provided with a semi-circular recess $i$ for engaging the balance of the tongue to bend it from the full line position shown in Fig. 7 into the closed eye position shown in ghost outline in Fig. 8 and to thus form the grip 15. The upper die is also provided with a depending V-shaped notch $j$ offset from the recess $i$ for depressing the side of the tube 17 to provide a groove 24 and thus crimp the tube into binding engagement with the conductor B as best shown in Figs. 1, 1a and 8.

The lower die is provided on its upper surface $k$ and opposite the recess $i$ and notch $j$ with a pocket for receiving the tang end of the terminal and this pocket includes a rounded portion $l$ for holding the crotch portion 22 from shifting in the crimping tool. An upstanding V-shaped saddle $m$ receives the tube 17 as best shown in Figs. 1a and 7.

In operation the dies are caused to approach each other and in moving from the Fig. 7 position into the Fig. 8 position, the tongue 21 considered as a whole, wraps down snugly about the accumulated insulation shown at C in Fig. 6, in a clockwise motion, as viewed in Fig. 7, thus circularly clamping the cable irrespective of whatever dimension may be assumed by the portion of the insulation so wrapped. The wrap-down is continued as far as possible in order to obtain the requisite degree of rotary squeeze between the strip and the insulation. Preferably, the length of the strip is pre-fixed so that the tongue 21 curls about the insulation with its free end 23 contacting the terminal more or less at right angles thereto as shown in Fig. 8. During the terminal part of this operation the notch $j$ creases the tube along its entire length to form the groove 24.

The die parts are so designed that the grip 15 bites slightly into the insulation encircled thereby to thus insure a positive gripping of the cable and the forming of a metallic ferrule to protect the end of the insulation. Also the depressing of the tube 17 is so governed that the original cylindrical configuration of the tube, and the portion of the conductor B contained therein, are deformed into the two-lobed design illustrated which has been found effective in staking the terminal to the conductor without rupturing any of the fine strands which go to make up the conductor B.

In the final structure there is formed in effect two tubes in axial alignment, a tube 17 of small internal diameter to receive the conductor and a tube 15 of large internal diameter to embrace the entire cable end including the insulation of increased diameter and its braided casing.

I claim:

1. In the art of forming an electric terminal from a blank comprising a flat sheet metal stamping having at one end a tang forming portion and at its other end an insulation grip forming portion, the method which includes the steps of drawing a mid-portion of the blank into an integral seamless tube whose axis is at right angles to the plane of the blank, bending the tube at its root end to cause the tube to extend with its axis parallel to and offset slightly from said plane, and bending the insulation grip forming end portion of the blank back upon itself about the axis of the tube and into a form substantially U-shaped.

2. In the art of forming an electric terminal from a flat sheet metal blank, the method which consists in drawing a portion of the flat blank into a seamless tube extending initially at right angles to the plane of the blank, bending the tube to extend with its axis parallel to and offset from said plane and bending another strip-like portion of the blank back upon itself into a substantially U-shaped form of tongue with its crotch portion substantially coaxial with the tube.

3. A one-piece sheet metal terminal of the flag type including a flat elongated strip of metal with one end of greater width than the other and provided with an aperture, said other end forming a long bendable strip and a tube projecting integrally and laterally from a mid-length portion of a long edge of the elongated strip, offset from the plane of the elongated strip and with the axis of the tube extending parallel to the plane containing the flat strip at right angles to the length of the said strip.

4. A one-piece terminal formed of sheet metal and of T-shape in plan, a seamless tube having both ends open and forming the stem of the T, the head of the T being flat and contained in a plane tangent to one side of the tube, the portion of the head of the T on one side of the tube forming an apertured tongue and the portion of the head of the T on the opposite side of the head forming a long flexible strip adapted to be wrapped about the axis of the tube to form a second tube coaxial with the first-named tube.

5. The terminal defined in claim 4 and in which the bore of the first-named tube at the end adjacent the head of the T is beveled to form a funnel-like stop shoulder and throat.

MARTIN D. BERGAN.

REFERENCES CITED

The following references are of record in the file of this patent:

UNITED STATES PATENTS

| Number | Name | Date |
|---|---|---|
| 213,458 | Shuster | Mar. 18, 1879 |
| 1,019,423 | Case | Mar. 5, 1912 |
| 1,619,517 | Hughes | Mar. 1, 1927 |
| 2,313,212 | Alden | Mar. 9, 1943 |
| 2,340,360 | Alden | Feb. 1, 1944 |
| 2,371,469 | Rogoff | Mar. 13, 1945 |
| 2,390,039 | Slayter et al. | Nov. 27, 1945 |
| 2,439,947 | Pontius | Apr. 20, 1948 |